(12) United States Patent
Jones (10) Patent No.: US 11,258,828 B2
(45) Date of Patent: Feb. 22, 2022

(54) SYSTEMS AND METHODS FOR MONITORING AND CORRECTING COMPUTER SYSTEM SECURITY PRACTICES

(71) Applicant: RiskLens, Inc., Spokane, WA (US)

(72) Inventor: Jack Jones, Spokane, WA (US)

(73) Assignee: Risklens, Inc., Spokane, WA (US)

( * ) Notice: Subject to any disclaimer, the term of this patent is extended or adjusted under 35 U.S.C. 154(b) by 90 days.

(21) Appl. No.: 16/573,175

(22) Filed: Sep. 17, 2019

(65) Prior Publication Data

US 2020/0014728 A1 Jan. 9, 2020

Related U.S. Application Data

(63) Continuation-in-part of application No. 15/990,739, filed on May 28, 2018, now abandoned.

(51) Int. Cl.
*H04L 29/06* (2006.01)

(52) U.S. Cl.
CPC .................. *H04L 63/205* (2013.01)

(58) Field of Classification Search
CPC ..... H04L 63/20; H04L 63/205; H04L 63/308; H04L 63/145; H04L 63/1408; G06F 21/54
USPC .......................................................... 726/1
See application file for complete search history.

(56) References Cited

U.S. PATENT DOCUMENTS

| | | | |
|---|---|---|---|
| 8,516,590 B1* | 8/2013 | Ranadive | H04L 63/1483 726/24 |
| 9,596,266 B1* | 3/2017 | Coleman | G06F 21/316 |
| 10,135,874 B1 | 11/2018 | Perry | |
| 2017/0093904 A1* | 3/2017 | Ng | H04L 63/20 |

OTHER PUBLICATIONS

International Searching Authority, International Search Report and Written Opinion for International Application No. PCT/US2020/44948 dated Feb. 11, 2021.
International Searching Authority, International Search Report and Written Opinion for International Application No. PCT/US2019/033777 dated Jul. 25, 2019.

* cited by examiner

*Primary Examiner* — Longbit Chai
(74) *Attorney, Agent, or Firm* — Rimon PC; Marc Kaufman (57) ABSTRACT

Systems and methods for monitoring and correcting security measures taken for a computer system are disclosed. Exemplary implementations may: determine a set of risk parameters of the computing system; collect sets of values of the security parameters at various times and determine the efficacy adjustments based on a comparison of the sets of values and an elapsed time between collection of the sets of values.

14 Claims, 3 Drawing Sheets

SYSTEMS AND METHODS FOR MONITORING AND CORRECTING COMPUTER SYSTEM SECURITY PRACTICES

RELATED APPLICATION DATA

This application is a Continuation-in-Part (CIP) of application Ser. No. 15/990,739, filed on May 28, 2018, the disclosure of which is incorporated herein.

FIELD OF THE DISCLOSURE

The present disclosure relates to systems and methods for determining the efficacy of security measures taken for a computer system.

BACKGROUND

An organization's cyber risk landscape is comprised of its assets (e.g., hardware, software, data, etc.), the threats to those assets (e.g., cyber criminals), and the controls intended to manage the frequency and magnitude of cyber-related loss.

For most organizations, the cyber risk landscape is constantly changing. Sometimes these changes are intentional and represent improvements, while at other times the changes are not intentional or desirable. Knowing what should change, what shouldn't change, what has changed, and what hasn't changed provides crucial insight into the degree to which an organization is in control of its cyber risk landscape, as well as knowing where improvements are necessary and why.

One of the most challenging aspects of cyber risk management is a threat landscape that is highly dynamic and made up of threat communities that are both external and internal to the organization. Furthermore, threat intelligence includes both a tactical and strategic point of view—i.e., what's going on right now and is likely to happen in the near future, versus how the threat landscape is evolving. As a result, making well-informed risk-based decisions can be a complex and challenging process.

Risk management efficacy boils down to the ability to make well-informed decisions (e.g., prioritization, solution selection, identification and treatment of root causes, etc.) and reliable execution. These are difficult to measure directly, particularly when related to a party or asset to which on-site access is limited or nonexistent. Also, it is often desirable to evaluate a party or asset more objectively and efficiently than can be achieved using questionnaires or site visits. Further, while known methods can be effective to reduce risk, such as by patching a security hole, there is no ability to analyze system management quality. For example, there is no reliable way of determining whether the corrective actions are effective and efficient over time because the complex interplay between elements and dynamic nature of computing systems makes cause and effect difficult, if not impossible, to correlate.

Organizations are complex and have many performance measures. Most have designated Key Performance Indicators (KPI)s, i.e. important performance indicators to be monitored, at various levels of the organization. Key Risk Indicators (KRIs) are similar in that they are leading indicators. However, KRIs signal increased probability of events that have a negative impact on business performance. For example, a KPI could be factory output while a KRI could be a power outage that affects equipment, or a cyber-attack.

There are various known methods for determining KRIs and KPIs. Examples of possible cyber risk KRIs include, new vulnerabilities (the results of scanning tools), patching compliance levels, security education and awareness levels, malware infections, detected attacks, lost laptops/mobile devices, number of open "high risk" audit findings, and on-time remediation of audit findings.

Organizations naturally want some means of gauging when the risk landscape has changed in a way that leadership needs to be concerned about. This, of course, means understanding what "normal" looks like and drawing lines in the sand that enable recognition of at least two levels of abnormal conditions: "Yellow"—a warning that risk levels are worse than what is considered to be normal and acceptable, but haven't yet reached a level of profound concern; and "Red"—a condition representing a level of risk that is beyond leadership's appetite.

Of course, each organization will have its own definition for what Yellow or Red conditions mean, and/or whether there should be additional condition levels. From a risk appetite/tolerance perspective however, there are two important dimensions to these indicator levels: where the thresholds themselves are defined; and how the organization responds to conditions that are in Yellow or Red states.

Most organizations ensure that thresholds are defined for their (KRIs). However, the response to exceeding the threshold is often overlooked and treated in an ad hoc fashion. It is very difficult to analyze and measure the risk associated with the normal or abnormal states of KRIs. Therefore, most organizations have no clear notion of where to define their KRI thresholds, resulting in not being able to determine the correct response to an abnormal state and not being able to determine if a particular response, or series of responses, was effective.

Figure 3:
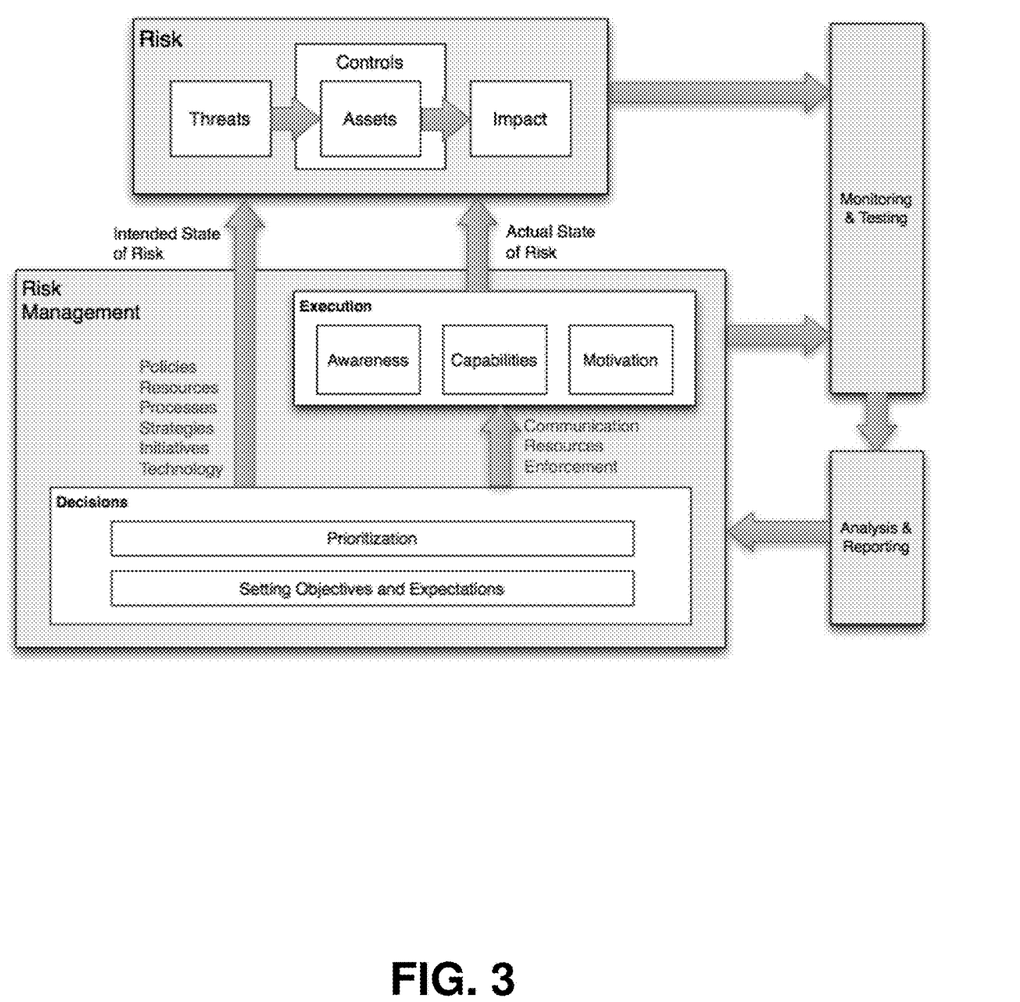
FIG. 3 is a schematic diagram of a risk management architecture.

FIG. 3 illustrates a typical risk landscape architecture. As seen in FIG. 3, risk 310 is determined by threats, assets, and impact. Risk management 320 includes execution, and decisions. Significantly a feedback loop, which runs from Risk 310 to monitoring and testing 330 to analysis and reporting 340 to risk management 320, provides decision-makers with intelligence regarding their risk landscape. The better this feedback loop is operating, the better able decision-makers will be to make appropriate risk management choices. Note, too, that this feedback loop includes not just information about risk (threats, assets, and impact) but also information regarding the efficacy of risk management practices. For the reasons noted above, the feedback loop of FIG. 3 is often unreliable and inaccurate.

SUMMARY

One implementation includes a system configured for monitoring and correcting cyber security practices on a computing environment having computing assets, the system comprising: one or more hardware processors configured by machine-readable instructions to: (a) receive a cyber security policy defining changes to be applied to computing assets, the cyber security policy further defining procedures to be taken by an organization for effecting the changes, the cyber security policy further defining timing at which the procedures should be implemented; (b) determine a set of risk management parameters which indicate a state of the computing environment at a time of collection of the risk management parameters, wherein the set of risk management parameters is determined based on at least one of the procedures; (c) collect successive sets of values of the risk management parameters at predetermined times; (d) determine, based on at least two of the sets of values of the risk management parameters, that at least one of the procedures has not resulted in the corresponding changes being applied to the computing assets based on the timing at which the procedures should be implemented defined by the cyber security policy; and (e) in response to (d), adjust at least one of the procedures of the security policy to create an adjusted security policy and apply the adjusted security policy to the computing environment.

Another implementation includes a computer-implemented method for monitoring and correcting a cyber security policy on a computing environment having computing assets, the method comprising: (a) receiving a cyber security policy defining changes to be applied to computing assets, the cyber security policy further defining procedures to be taken by an organization for effecting the changes, the cyber security policy further defining timing at which the procedures should be implemented; (b) determining a set of risk management parameters which indicate a state of the computing environment at a time of collection of the risk management parameters, wherein the set of risk management parameters is determined based on at least one of the procedures; (c) collecting successive sets of values of the risk management parameters at predetermined times; (d) determining, based on at least two of the sets of values of the risk management parameters, that at least one of the procedures has not resulted in the corresponding changes being applied to the computing assets based on the timing at which the procedures should be implemented defined by the cyber security policy; and (e) in response to (d), adjusting at least one of the procedures of the security policy to create an adjusted security policy and apply the adjusted security policy to the computing environment.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

The disclosed embodiments can be analogized to the optical concept of parallax. In astronomy, an understanding of our universe begins with measurements of distance—e.g., how far away a star, galaxy, etc., is. With this foundation, we are able to build our understanding of the universe; it's past, present, how it operates, how it's changing, why it's changing, and its likely future. Unfortunately, we aren't able to measure astronomic distances directly using some cosmological version of a tape measure. Instead, we leverage basic geometry and the principle of parallax, i.e. a displacement or difference in the apparent position of an object viewed along two different lines of sight.

For example, if you extend your arm in front of your face with your thumb pointing up and then focus on the thumb by closing first one eye and then the other, it looks like your thumb is moving relative to the background, when in fact it's just a matter of the distance between your eyes providing a different geometric perspective—parallax. Think of your eyes as forming the two points in the base of a triangle. We are then able to use basic geometric formulas to derive the distance to your thumb given that you know the distance between your eyes and how far your thumb appears to shift when looked at with one eye and then the other.

This parallax principle is used to measure the distance of objects in space, but in order to make this work given the great distances involved, there must be a very large distance between two points of perspective. For astrometric measurements, the "snapshots" (the two points that form the base of the triangle) can be taken when the earth is at extreme points in the opposite ends of its orbit of the sun. That significant distance in space from one side of the orbit to the other provides sufficient changes in perspective to allow the use simple geometry to derive distances to objects in deep space. Once distance to a deep space object is known, other important characteristics, such as whether the object is moving toward or away from the earth, how hot a star is, whether it is getting hotter or cooler, and whether it is moving in concert with the objects around it, can be measured.

Similarly, there are critical aspects of the cyber risk "universe", such as responses to KRIs, that can't be measured directly but that can be derived using a metaphor of the parallax principle. The difference being, instead of changes in perspective being provided by different points in space, cyber parallax will be provided by differences in conditions over time. For example, a "snapshot" of the status of elements in a cyber universe can be taken at more than one point in time. These different snapshots in time provide data that reflect changes (or the lack thereof), which can be crucial to our understanding of, and ability to better manage, cyber risk. Snapshots can be overlaid (stacked) over time on top of one another to statistically amplify data that are of particular importance, and filter out data (noise) that are not relevant to the current risk concerns.

The interval between applied snapshots can be adjusted based on upon the current risk concern. For example, snapshots taken in more frequent intervals will help to capture sudden changes to the normal state, which can be used to detect time-sensitive changes in a timely fashion. Snapshots taken at longer intervals will be more effective at detecting systemic and strategic conditions. Over time, examined conditions can be correlated across a large base of organizations (e.g., within the government) with loss experience, to begin statistically forecasting loss expectancy given certain conditions. The snapshots can be taken at a fixed relatively short interval and longer intervals can be created by using non-successive snapshots.

By being able to capture and analyze data that reflects the decision-making and execution characteristics of an organization, fundamental and/or systemic weaknesses that might otherwise go unresolved can be identified and managed.

Machine learning algorithms can be applied to provide automated analysis and reporting. The parallax metaphor can be applied in many use cases, such as: third-party risk management, development and tracking of Key Risk Indicators (KRIs) and Key Performance Indicators (KPIs).

Known technologies can identify specific security-related data (e.g., missing patches, missing antivirus updates, etc.), however none of those technologies use their data to evaluate the systemic and strategic conditions that reflect the efficacy of risk management policies. Risk management practice efficacy is driven by the ability to make well-informed decisions (e.g., prioritization, solution selection, identification and treatment of root causes, etc.) and reliable execution. These are difficult to measure directly, particularly in third-party organizations that we may be concerned about but don't have the ability to evaluate closely onsite or that we want to evaluate more objectively and efficiently than can be achieved using questionnaires or site visits. By being able to capture and analyze data that reflects the decision-making and execution characteristics of an organization, the disclosed embodiments can identify and manage fundamental and/or systemic weaknesses that might otherwise go unresolved. Machine learning algorithms can be applied to provide automated analysis and reporting. The embodiments can be used in the following situations: third-party risk management, development and tracking of KRIs and KPIs, policy/process definition (e.g., visibility levels, change management practices) as well as compliance to those expectations, strategic reporting to management, Regulatory reporting/oversight, Identifying and managing differences in RM capabilities across different parts of large, decentralized organizations (e.g., government, global entities, etc.), and cyber warfare (to identify and strategically target weaknesses in an enemy)

Figure 1:
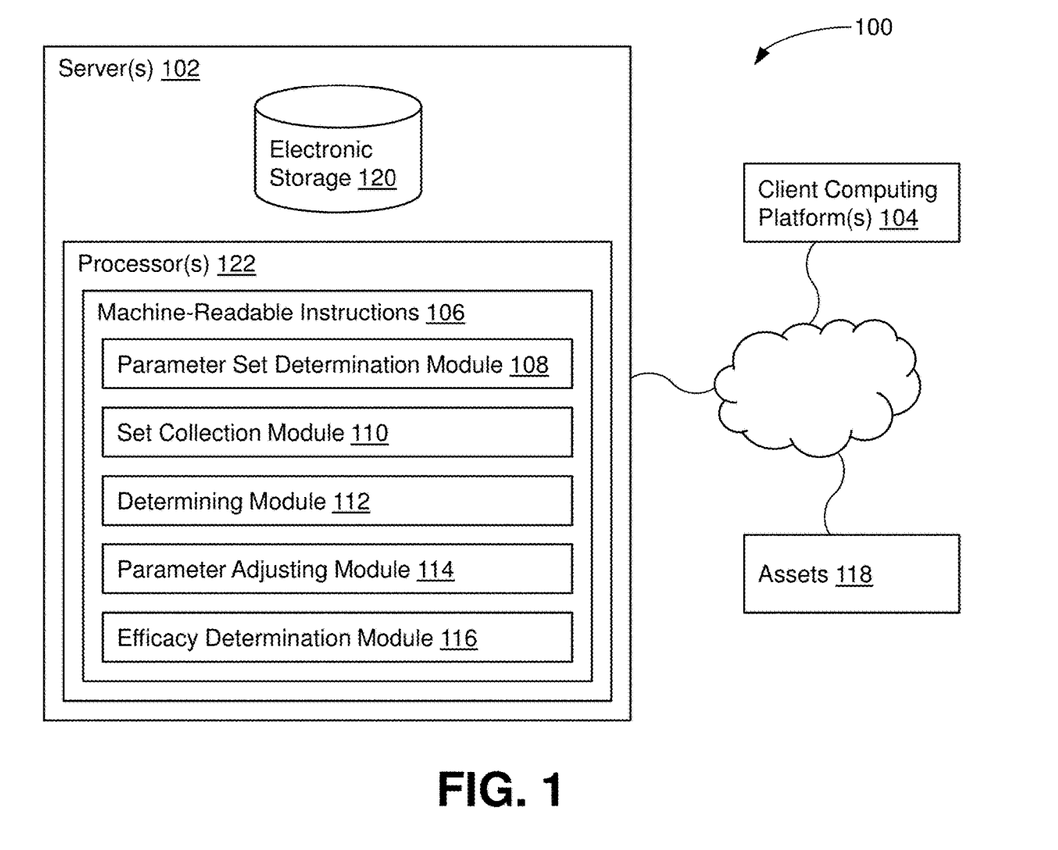
FIG. 1 is a schematic block diagram of a distributed computing system configured for determining the efficacy of cyber security measures, in accordance with one or more implementations.

FIG. 1 illustrates a system 100 configured for determining the efficacy of security measures take for a collection of computing assets 118, in accordance with one or more implementations. In some implementations, system 100 may include one or more servers 102. Server(s) 102 may be configured to communicate with one or more client computing platforms 104 and system computing assets 118, according to a client/server architecture and/or other architectures. Client computing platform(s) 104 are used to provide user interaction (e.g., monitoring and control) and may be configured to communicate with other client computing platforms via server(s) 102 and/or according to a peer-to-peer architecture and/or other architectures. Users may access system 100 via client computing platform(s) 104. Assets 118 make up the collection of assets for which risk is being managed. Assets 118 can be remotely distributed in any manner and under the control and/or possession of one or multiple parties.

Server(s) 102 may be configured by machine-readable instructions 106. Machine-readable instructions 106 may include one or more instruction modules. The instruction modules may include computer program modules. The instruction modules may include one or more of a parameter set determination module 108, a set collection module 110, a determining module 112, a parameter adjusting module 114, an efficacy determination module 116, and/or other instruction modules.

Parameter set determination module 108 may be configured to determine a set of risk parameters of the computing system to be collected from assets 118. Risk parameters are system state parameters or variables which can be indicative of potential risk or lack thereof. The selection of risk parameters to be included in the set depends on the composition and operation of the system being monitored, the threat landscape, and the risk tolerance of the organization of concern. Risk parameter selection is based upon what one is trying to understand/learn about the risk management program. For example, if one wants to understand whether the organization has incomplete visibility into their risk landscape, vulnerability scanning data that shows some systems aren't being patched at all could be collected, even though the organization's policies and practices would dictate patching every 30 days. That same vulnerability scanning data might also inform that new systems are being implemented in a non-compliant condition but get patched in the next cycle. This indicates that the organization has poor change management/implementation practices. By way of non-limiting example, the set of risk parameters may include parameters related to asset existence, asset value, control conditions, network traffic volume, and/or threat landscape. The set of risk parameters may include parameters collected by anti-virus software, network-based vulnerability scanners such as NetRecon, network read/write utilities such as Netcat, data loss prevention technologies, configuration management database (CMDB) technologies, and/or vulnerability scanning technologies.

The threat landscape can encompass various known components, such as human threats (e.g. hackers, internal personnel error, malicious internal personnel) natural phenomena (e.g. power outages or hardware damage due to weather or earthquake) and internal asset threats (e.g. security weaknesses in mobile devices, software bugs).

Set collection module 110 may be configured to collect a first set of values of the risk parameters of the computing system at a first time t1, collect a second set of values at of the risk parameters of the computing system at a second time t2, collect a third set of values at of the risk parameters of the computing system at a third time t3, and collect a fourth set of values at of the risk parameters of the computing system at a fourth time t4. Time t1 may be a time that is before the adjustment is made, t2 may be a time after the adjustment is made, t3 may be a time after t2 and t4 may be a time after t3. The timing of collection of sets of values can be predetermined and can have fixed intervals. However, the collected sets of values for any determination need not be consecutive and thus the interval between sets of values used in a determination can be varied. Any number of sets of values of risk parameters can be collected and the time interval therebetween can vary based on specific application parameters. In some implementations, the period between successive times of value collection may be constant. The successive time may include a time that is in regular succession without gaps, according to some implementations. In some implementations, the timer period between successive times may vary.

Determining module 112 may be configured to determine, based on the first set of parameters that there is a cyber risk management issue relating to the computing system. Parameter adjusting module 114 may be configured to adjust operate parameters of the computer system to address the cyber risk management issue. Adjustments to identified risk management deficiencies might include; changes to policies, changes to procedures, additional training or enforcement activities, implementation of new technologies, and the like.

Efficacy determination module 116 may be configured to determine the efficacy of the adjustment based on a comparison of two of the sets of values, or more sets of values, and an elapsed time between collection of two of the sets of values. For example, if a problem had been identified and adjustments had been made the degree to which the adjustments eradicated the original problem can be monitored and determined. An algorithm applied to the determine the efficacy of the adjustment may vary based on the elapsed time. The algorithm may be a rule. The algorithm may include a precise rule specifying how to solve some problem, according to some implementations. Examples of the algorithm may include one or more of:

- if 13% of an organization's systems are identified as not being actively managed (i.e., they aren't showing characteristics generally associated with active management, like patching, antivirus updates, etc.) then the organization had 87% visibility into that dimension of their risk landscape.
- If 73% of new systems being introduced to their environment came online with appropriate patching and configuration in place, then the change management process was only 73% effective.
- If subsequent changes in policy and/or process for the first example above resulted in only 2% of systems now not being actively managed, a measurable improvement in risk management efficacy has been achieved.
- If subsequent changes in policy, etc. were implemented to address the second example above, and as a result 99% of systems were being implemented with appropriate configuration, patching, etc., that would represent a measurable improvement in risk management efficacy.

Server(s) 102, client computing platform(s) 104, and/or assets 108 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or assets 108 may be operatively linked via some other communication media.

Server(s) 102 may include electronic storage 120, one or more processors 122, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102. Assets 108 may be under to possession and/or control of external entities participating with system 100, and/or other resources. Assets 108 make up the computer system/architecture that is being managed.

Electronic storage 120 may comprise non-transitory storage media that electronically stores information. The electronic storage media of electronic storage 120 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 120 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 120 may include one or more virtual storage resources (e.g., cloud storage, a virtual private network, and/or other virtual storage resources). Electronic storage 120 may store software algorithms, information determined by processor(s) 122, information received from server(s) 102, information received from client computing platform(s) 104, and/or other information that enables server(s) 102 to function as described herein.

Processor(s) 122 may be configured to provide information processing capabilities in server(s) 102. As such, processor(s) 122 may include one or more of a digital processor, an analog processor, a digital circuit designed to process information, an analog circuit designed to process information, a state machine, and/or other mechanisms for electronically processing information. Although processor(s) 122 is shown in FIG. 1 as a single entity, this is for illustrative purposes only. In some implementations, processor(s) 122 may include a plurality of processing units. These processing units may be physically located within the same device, or processor(s) 122 may represent processing functionality of a plurality of devices operating in coordination. Processor(s) 122 may be configured to execute modules 108, 110, 112, 114, 116, and/or other modules. Processor(s) 122 may be configured to execute modules 108, 110, 112, 114, 116, and/or other modules by software; hardware; firmware; some combination of software, hardware, and/or firmware; and/or other mechanisms for configuring processing capabilities on processor(s) 122. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 108, 110, 112, 114, and 116 are illustrated in FIG. 1 as being implemented within a single processing unit, in implementations in which processor(s) 122 includes multiple processing units, one or more of modules 108, 110, 112, 114, and/or 116 may be implemented remotely from the other modules. The description of the functionality provided by the different modules 108, 110, 112, 114, and/or 116 described below is for illustrative purposes, and is not intended to be limiting, as any of modules 108, 110, 112, 114, and/or 116 may provide more or less functionality than is described. For example, one or more of modules 108, 110, 112, 114, and/or 116 may be eliminated, and some or all of its functionality may be provided by other ones of modules 108, 110, 112, 114, and/or 116. As another example, processor(s) 122 may be configured to execute one or more additional modules that may perform some or all of the functionality attributed below to one of modules 108, 110, 112, 114, and/or 116.

Figure 2:
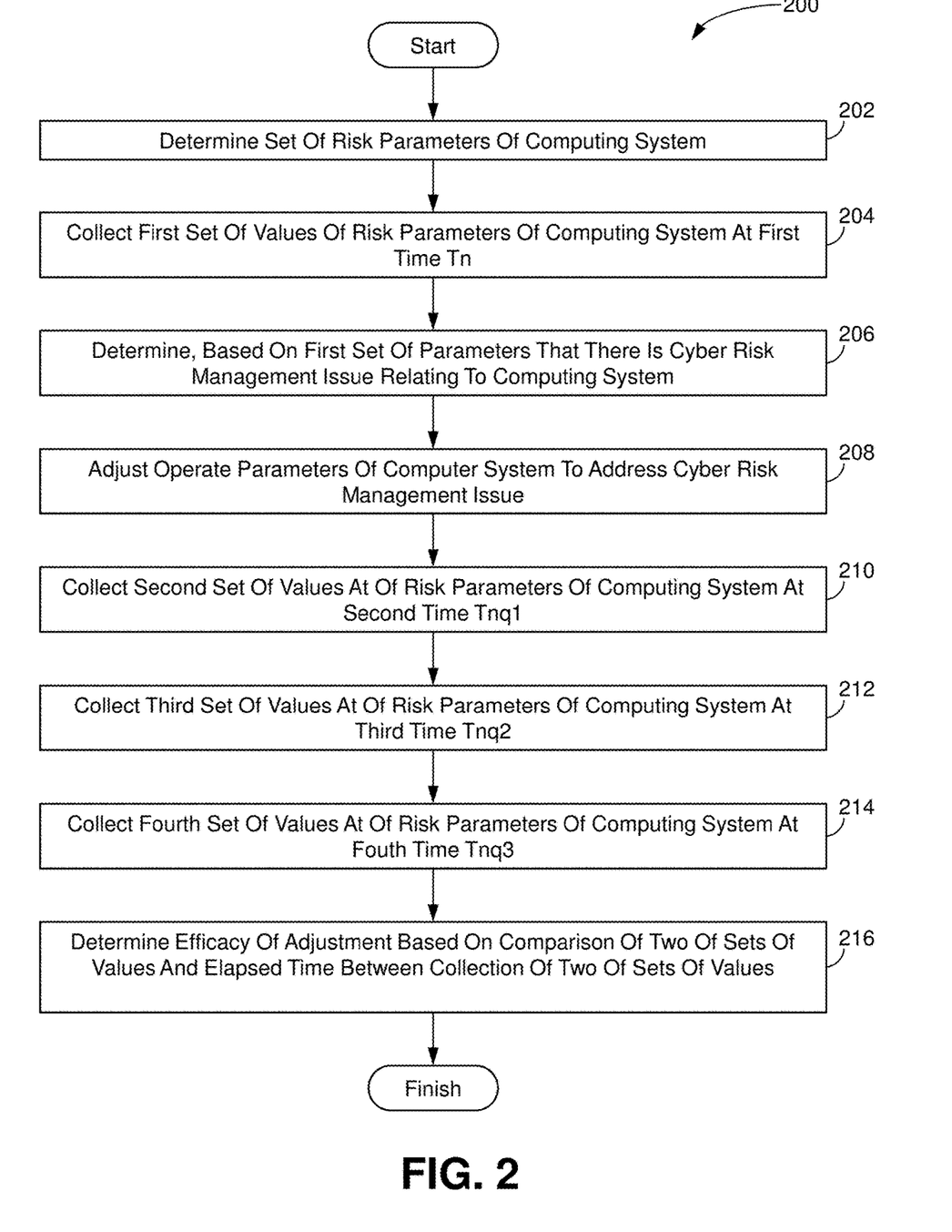
FIG. 2 is a flowchart of a method for determining the efficacy of cyber security measures, in accordance with one or more implementations.

FIG. 2 illustrates a method 200 for determining the efficacy of security measures take for a computer system, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include determining a set of risk parameters of the computing system. Operation 202 may be performed by one or more hardware processors configured by machine-readable instructions including a module that is the same as or similar to parameter set determination module 108, in accordance with one or more implementations.

An operation 204 may include collecting a first set of values of the risk parameters of the computing system at a first time t1. Operation 204 may be performed by one or more hardware processors configured by machine-readable instructions including a module that is the same as or similar to set collection module 110, in accordance with one or more implementations.

An operation 206 may include determining, based on the first set of parameters that there is a cyber risk management issue relating to the computing system. Operation 206 may be performed by one or more hardware processors configured by machine-readable instructions including a module that is the same as or similar to determining module 112, in accordance with one or more implementations.

An operation 208 may include adjusting operating parameters of the computer system to address the cyber risk management issue. Operation 208 may be performed by one or more hardware processors configured by machine-readable instructions including a module that is the same as or similar to parameter adjusting module 114, in accordance with one or more implementations.

An operation 210 may include collecting a second set of values at of the risk parameters of the computing system at a second time t2. Operation 210 may be performed by one or more hardware processors configured by machine-readable instructions including a module that is the same as or similar to set collection module 110, in accordance with one or more implementations.

An operation 212 may include collecting a third set of values at of the risk parameters of the computing system at a third time t3. Operation 212 may be performed by one or more hardware processors configured by machine-readable instructions including a module that is the same as or similar to set collection module 110, in accordance with one or more implementations.

An operation 214 may include collecting a fourth set of values at of the risk parameters of the computing system at a fourth time t4. Operation 214 may be performed by one or more hardware processors configured by machine-readable instructions including a module that is the same as or similar to set collection module 110, in accordance with one or more implementations.

An operation 216 may include determining the efficacy of the adjustment based on a comparison of two of the sets of values and an elapsed time between collection of two of the sets of values. Operation 216 may be performed by one or more hardware processors configured by machine-readable instructions including a module that is the same as or similar to efficacy determination module 116, in accordance with one or more implementations.

Intentional and desirable changes to a cyber risk landscape tend to happen either: on a set schedule (e.g., weekly system patches), as part of a project (e.g., implementation of a new business or security technology), or in response to undesirable changes that have occurred (e.g., in response to notification of a new threat exploit, discovery of non-compliant systems, etc.) In each case, the timing and scope of these changes, e.g., the systems or software where these changes are expected to occur, will be well defined. As a result, data from the organization's landscape should confirm that the changes occurred when and where expected. However, if data shows that the intended changes occurred in some places but not others, it strongly suggests that wherever the changes did not occur are poorly managed or controlled.

Conversely, if data from the organization's landscape show that changes have occurred "spontaneously", i.e., not based on a set schedule, not as part of a project and not in response to undesirable changes that have occurred, that too suggests that wherever the changes occurred are poorly managed or controlled. This is especially true if the changes were detrimental in some fashion (e.g., degradation of one or more system configurations, the installation of new technologies, etc.).

In either case, intentional change or unintentional changes, the opportunity to recognize where change management isn't functioning properly is crucial to avoiding cybersecurity-related surprises. This also can be a reliable indicator of an organization's overall cyber risk management maturity.

As noted above, there are several potential sources of data commonly in use by organizations for other cyber-related purposes. Examples of such data sources include:
Antivirus technologies (e.g., McAfee™)
Vulnerability scanning technologies (e.g., Qualys™)
Network discovery technologies (e.g., RedSeal™)
Configuration management technologies (e.g., SolarWinds™)
Sensitive data discovery technologies (e.g., ProofPoint™)
Access privilege management technologies (e.g., CyberArk™)
Anti-phishing technologies (e.g., PhishMe™)
Password strength analysis technologies (e.g., PasswordMeter™)

These sorts of "find it and fix it" technologies each potentially yield data regarding a specific part of an organization's cyber risk landscape. None of them however, have been intended or designed to solve the strategic problem of determining whether or to what degree an organization is effectively managing change within its cyber risk landscape. When the various sources of data are evaluated in combination using CPI, some critical analytic insights can be discovered that will make the difference between making strategic and cost-effective improvements versus applying resources more haphazardly and tactically. By being able to identify and differentiate where, when, and why changes within the cyber risk landscape are (or are not) occurring outside of an organization's intent, organizations are able to make cost-effective improvements, and objectively measure and demonstrate their maturity.

One of the most significant cyber risk problems organizations experience is "risk management groundhog day" (RMGD), i.e., addressing the same problems over and over again. This occurs because organizations are unable to recognize and treat the root causes behind poor change management. Using the implementations disclosed herein, an organization experiencing RMGD will see repeated fluctuations over time, i.e., "rebounding", as they attempt to fix specific problems. As an example, an enterprise my make multiple attempts to change/correct access privilege compliance only to have the problems reoccur. However, having recognized that a problem is repeating, and where, an organization can investigate and treat root causes. Treatment efficacy will be reflected in a reduction of rebound frequency and severity. This improvement often will occur not only for the specific change management problem that was treated (e.g., access privilege compliance), but for other problems as well (e.g., password compliance) because root causes tend to be systemic in nature, affecting more than one problem area. The number of problem areas and the frequency and severity in rebounding can provide objective, data-driven evidence regarding an organization's risk management maturity (e.g., a more mature risk management policy will lower frequency and severity of rebounding).

The condition of systems and applications that are actively being managed by an organization will reflect certain changes over time. These changes may include regular or periodic patching, and/or security-related changes in configuration. Systems that are not actively being managed are likely either instances of "shadow IT", i.e., rogue implementations that aren't being managed by the organization's core personnel or processes, or other unauthorized technologies that are "invisible" from a risk management perspective. For example, when all of the data sources show the same change-related problems for a particular set of technology assets (e.g., databases of a certain type), it is a powerful indicator that those databases are "shadow IT".

Even when assets (e.g., one or more servers) are being actively managed by an organization's core personnel and processes, the value and/or criticality of those assets may increase or decrease due to changes in how they're being used. This change in value/criticality usually should result in different risk management controls. If value/criticality increases, various management controls could be set to be more stringent, and vice versa.

For example, if the volume of sensitive data on a server increases sufficiently, controls like patching and configuration settings should probably change as well. If, however, these controls don't change when the asset value exceeds a certain threshold, it suggests that the organization hasn't recognized the change in asset value. The implementations disclosed herein can identify the mismatched conditions (high value asset, and insufficient controls) and also help an organization recognize that its current asset value monitoring capabilities are deficient.

Some assets may show signs of active management (e.g., regular patching, etc.), and yet evidence may exist that suggests an absence of visibility into changes that occur to control conditions. For example, a population of assets may receive regular patching and yet one or more of the assets may revert to an unpatched state soon after the patches have been applied. If this deficient state persists until the next patch cycle, it may suggest that the organization does not monitor control conditions for changes and deficiencies. This can be a particularly important consideration for assets that exist in high-threat landscapes (e.g., are Internet-facing).

Organizations demonstrate an ability to prioritize effectively when they apply risk management resources in alignment with the loss exposure they face. High value assets should receive patches and other changes more frequently or in a timelier fashion than low value assets. Likewise, assets in a high threat landscape should receive more frequent attention than those in low threat landscapes. Implementations disclosed herein will be able to identify when an organization isn't prioritizing its risk management resources effectively. For example, if low value assets are being patched before high value assets in response to changes in the threat landscape, it suggests that although the organization is cognizant of the new threat it isn't prioritizing its response appropriately. Such mis-prioritization is likely due to poor risk analysis quality.

When used initially to develop a baseline, and over time through repeated use, implementations disclosed herein can indicate whether or not an enterprises cyber risk management is improving, how fast it is improving (or backsliding), and which controls have had the greatest effect. The number of problem areas, as well as the frequency and severity in rebounding can provide objective, data-driven evidence regarding an organization's risk management effectiveness.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured for monitoring and correcting cyber security practices on a computing environment having computing assets, the system comprising:
   one or more hardware processors configured by machine-readable instructions to:
   (a) receive a cyber security policy defining changes to be applied to computing assets, the cyber security policy further defining procedures to be taken by an organization for effecting the changes, the cyber security policy further defining timing at which the procedures should be implemented;
   (b) determine a set of risk management parameters which indicate a state of the computing environment at a time of collection of the risk management parameters, wherein the set of risk management parameters is determined based on at least one of the procedures;
   (c) collect successive sets of values of the risk management parameters at predetermined times;
   (d) determine, based on at least two of the sets of values of the risk management parameters, that at least one of the procedures has not resulted in the corresponding changes being applied to the computing assets based on the timing at which the procedures should be implemented defined by the cyber security policy such that expected changes associated with the defined procedures to be taken at the defined timing by the organization for effecting the changes have not been affected as it should be according to the received cyber security policy; and
   (e) in response to (d) after determining what causes to the corresponding changes have not occurred based on the analysis of (d), adjust at least one of the procedures of the security policy to create an adjusted security policy and apply the adjusted security policy to the computing environment accordingly.

2. The system of claim 1, wherein (e) indicates that at least one of the changes has not been effected on an intended computing asset at an intended time.

3. The system of claim 1, wherein (e) indicates changes occurred to at least one computing asset that do not correspond to a change specified by the cyber security policy.

4. The system of claim 1, wherein (e) comprises adjusting at least one of the procedures of the security policy based on a prioritization of the computing assets.

5. The system of claim 1, wherein (e) comprises adjusting at least one of the procedures of the security policy based on a prioritization of detected threats to the computing assets.

6. The system of claim 1, wherein an elapsed time between successive collections of sets of values of the risk management parameters varies.

7. The system of claim 1, wherein the set of risk management parameters includes parameters related to asset existence, asset value, control conditions, network traffic volume, software status, and/or threat landscape.

8. A computer-implemented method for monitoring and correcting a cyber security policy on a computing environment having computing assets, the method comprising:
   (a) receiving a cyber security policy defining changes to be applied to computing assets, the cyber security policy further defining procedures to be taken by an organization for effecting the changes, the cyber security policy further defining timing at which the procedures should be implemented;
   (b) determining a set of risk management parameters which indicate a state of the computing environment at a time of collection of the risk management parameters, wherein the set of risk management parameters is determined based on at least one of the procedures;
   (c) collecting successive sets of values of the risk management parameters at predetermined times;
   (d) determine, based on at least two of the sets of values of the risk management parameters, that at least one of the procedures has not resulted in the corresponding changes being applied to the computing assets based on the timing at which the procedures should be implemented defined by the cyber security policy such that expected changes associated with the defined procedures to be taken at the defined timing by the organization for effecting the changes have not been affected as it should be according to the received cyber security policy; and
   (e) in response to (d) after determining what causes to the corresponding changes have not occurred based on the analysis of (d), adjust at least one of the procedures of the security policy to create an adjusted security policy and apply the adjusted security policy to the computing environment accordingly.

9. The method of claim 8, wherein (e) indicates that at least one of the changes has not been effected on an intended computing asset at an intended time.

10. The method of claim 8, wherein (e) indicates changes occurred to at least one computing asset that do not correspond to a change specified by the cyber security policy.

11. The method of claim 8, wherein (e) comprises adjusting at least one of the procedures of the security policy based on a prioritization of the computing assets.

12. The method of claim 8, wherein (e) comprises adjusting at least one of the procedures of the security policy based on a prioritization of detected threats to the computing assets.

13. The method of claim 8, wherein an elapsed time between successive collections of sets of values of the risk management parameters varies.

14. The method of claim 8, wherein the set of risk management parameters includes parameters related to asset existence, asset value, control conditions, network traffic volume, software status, and/or threat landscape.

* * * * *